United States Patent
Sturm

(10) Patent No.: US 11,947,637 B2
(45) Date of Patent: Apr. 2, 2024

(54) AUTHORIZATION OF ACCESS RIGHTS LICENSES

(71) Applicant: Comcast Cable Communications, LLC, Philadelphia, PA (US)

(72) Inventor: Walter Sturm, Far Hills, NJ (US)

(73) Assignee: Comcast Cable Communications, LLC, Philadelphia, PA (US)

(*) Notice: Subject to any disclaimer, the term of this patent is extended or adjusted under 35 U.S.C. 154(b) by 240 days.

(21) Appl. No.: 16/886,106

(22) Filed: May 28, 2020

(65) Prior Publication Data

US 2021/0374212 A1 Dec. 2, 2021

(51) Int. Cl.
- *G06F 21/10* (2013.01)
- *G06F 21/60* (2013.01)
- *G06F 21/62* (2013.01)

(52) U.S. Cl.
CPC .......... *G06F 21/105* (2013.01); *G06F 21/604* (2013.01); *G06F 21/6218* (2013.01); *G06F 2221/2137* (2013.01); *G06F 2221/2141* (2013.01)

(58) Field of Classification Search
CPC .. G06F 21/105; G06F 21/604; G06F 21/6218; G06F 2221/2137; G06F 2221/2141
See application file for complete search history.

(56) References Cited

U.S. PATENT DOCUMENTS

| | | | |
|---|---|---|---|
| 5,832,231 A | 11/1998 | Raman et al. | |
| 7,720,983 B2 | 5/2010 | Klemets et al. | |
| 7,886,318 B2 | 2/2011 | Wang et al. | |
| 8,386,465 B2 | 2/2013 | Ansari et al. | |
| 8,521,709 B2 | 8/2013 | Gottlieb et al. | |
| 8,681,680 B2 | 3/2014 | Mao et al. | |
| 8,863,204 B2 | 10/2014 | Whyte et al. | |
| 9,124,642 B2 | 9/2015 | Choudhury et al. | |
| 9,143,825 B2* | 9/2015 | Chittella | H04N 21/2381 |
| 9,584,557 B2 | 2/2017 | Panje et al. | |
| 9,692,767 B2* | 6/2017 | Stappenbeck, Jr. | G06F 21/105 |
| 9,723,343 B2 | 8/2017 | Applegate et al. | |
| 10,162,943 B2 | 12/2018 | Park | |
| 10,389,838 B2* | 8/2019 | Li | H04L 67/568 |
| 10,749,925 B1* | 8/2020 | Hudgin | H04L 67/02 |
| 11,157,633 B1* | 10/2021 | Verma | H04L 63/0457 |
| 2012/0090018 A1* | 4/2012 | Padhye | G11B 20/0021 726/4 |
| 2013/0138795 A1 | 5/2013 | Field et al. | |

(Continued)

*Primary Examiner* — Kambiz Zand
*Assistant Examiner* — Afaq Ali
(74) *Attorney, Agent, or Firm* — Banner & Witcoff, Ltd.

(57) ABSTRACT

Systems, apparatuses, and methods are described for preauthorizing a batch of access rights licenses, e.g., Digital Rights Management (DRM) licenses, and storing them at a location. The preauthorization may be based on predicting a batch of content items to be viewed. The location may be a content server or a user device. After receiving a request from the user device to play back a content item of the batch of predicted content items, the DRM license may be provided from the storage location instead of performing an authorization operation to obtain one from a DRM server. Providing the DRM license from the storage location may take less time than performing the authorization operation to obtain the DRM license from the DRM server.

22 Claims, 8 Drawing Sheets

(56) References Cited

U.S. PATENT DOCUMENTS

| | | |
|---|---|---|
| 2013/0144750 A1 | 6/2013 | Brown |
| 2014/0052873 A1 | 2/2014 | Watson et al. |
| 2015/0358330 A1* | 12/2015 | Stappenbeck ......... H04L 63/105 |
| | | 726/4 |
| 2016/0014461 A1 | 1/2016 | Leech et al. |
| 2016/0180064 A1* | 6/2016 | Boivin ............... H04N 21/2541 |
| | | 726/28 |
| 2019/0188360 A1* | 6/2019 | Park ...................... H04L 63/102 |
| 2019/0215564 A1* | 7/2019 | Webb ................. H04N 21/8352 |
| 2019/0222672 A1 | 7/2019 | Greenberg |
| 2019/0318107 A1* | 10/2019 | Capone ............... G06F 21/6218 |
| 2020/0034050 A1* | 1/2020 | Brasfield ............... G06F 12/084 |
| 2020/0228866 A1* | 7/2020 | Webb .................. G06F 16/1824 |
| 2020/0394280 A1* | 12/2020 | del Valle Diharce ..... H04L 9/14 |

* cited by examiner

AUTHORIZATION OF ACCESS RIGHTS LICENSES

BACKGROUND

Video playback may begin when a user initiates a play sequence by requesting a particular video. If that requested video is protected by access controls, such as Digital Rights Management (DRM), a license may be needed before playback can begin. Obtaining that license may require one or more authorization steps. As a result, there may be an undesired delay between a time that a user requests a video and a time that playback can begin.

SUMMARY

The following summary presents a simplified summary of certain features. The summary is not an extensive overview and is not intended to identify key or critical elements.

Systems, apparatuses, and methods are described for preauthorizing and/or storing a batch of licenses for content access rights, such as DRM licenses, for a batch of content items. The preauthorizing and/or storing may occur before a user device sends a request for a content item of the batch of content items. The preauthorization and/or storing may be based on predicting the batch of content items that may be requested for output via the user device. The predicting may be based on, for example, a viewing history, a user account, a popularity of a content item and/or service, subject matter of a content item, etc. A server may cause storage of the batch of DRM licenses and/or manifests at a location. The DRM licenses may permit output of the batch of content items via the user device. Each of the manifests may indicate, for a content item of the batch of content items, content segments retrievable by the user device. Based on a request from the user device for a content item of the batch of content items, the server may provide a DRM license and/or manifest for the content item from the storage location. Based on activity of the user device, the server may store the DRM licenses and/or manifests based on a determination that an expiration time of the DRM licenses of the batch of content items is after a request to view the content items may be received from the user device.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
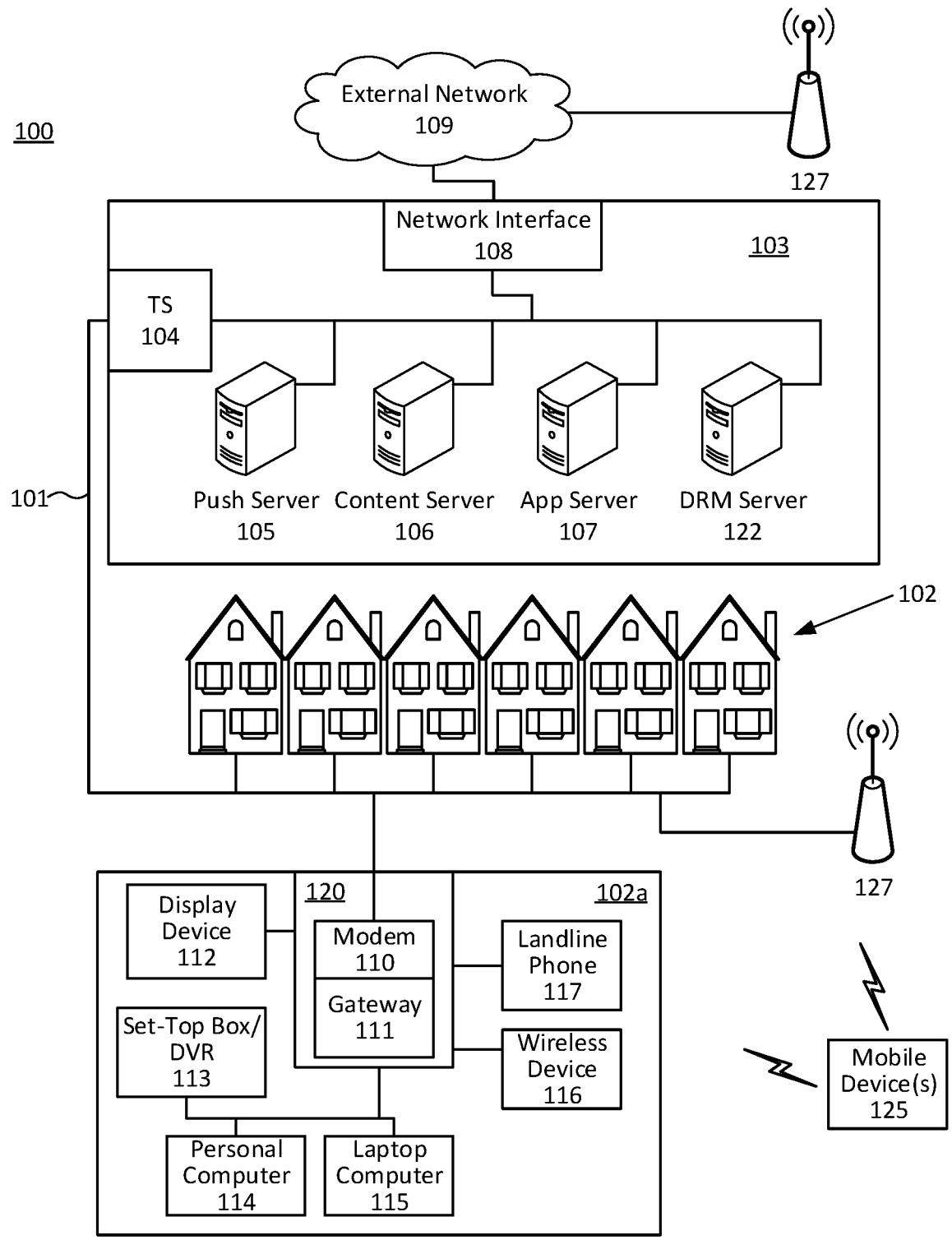
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured to manage communications among those devices, to manage communications between those devices and backend devices such as servers 105-107 and 122, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. This or a separate application server may be responsible for monitoring user viewing habits and collecting information from that monitoring for use in selecting advertisements. This or another separate application server may be responsible for formatting and inserting advertisements in a video stream being transmitted to devices in the premises 102 and/or to the mobile devices 125. The content server 106 may perform authorization operations to obtain DRM licenses from a DRM server 122 for user-requested content. Alternatively, the DRM server 122 may perform the authorization operation. The DRM server 122 may be a separate entity, or it may be combined with the content server 106. If combined with the content server 106, the DRM server 122 may further assume the role of the authentication server comprising software to validate user identities and entitlements. Although FIG. 1 shows the DRM server 122 and the content server 106 in the same local office 103, these servers (and/or other servers) may be located in different local offices and/or otherwise dispersed across one or more networks. The local office 103 may comprise additional push, content, and/or application servers, and/or other types of servers. Although shown separately, the push server 105, the content server 106, the application server 107, the DRM server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
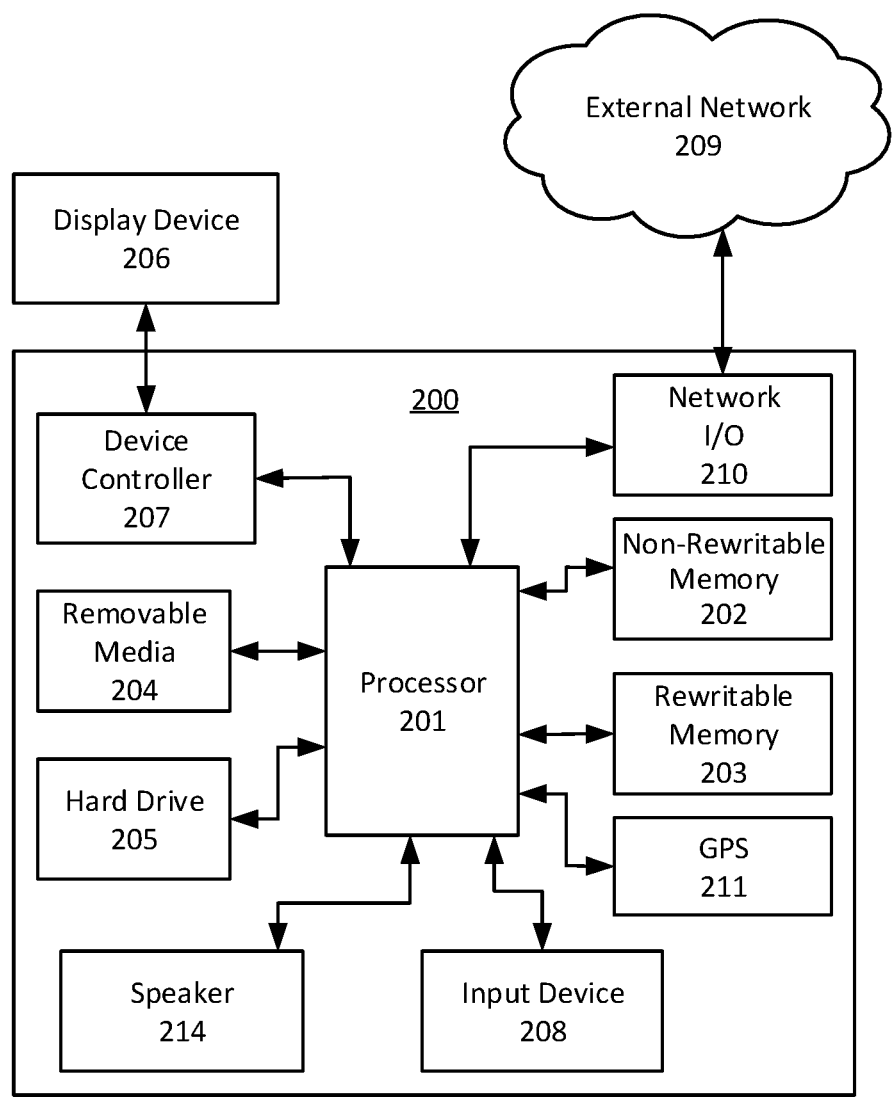
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices associated with the external network 109) and any other computing devices discussed herein that may be used to perform one or more operations described herein (e.g., servers, proxy devices, and/or set-top boxes that may store DRM licenses locally). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
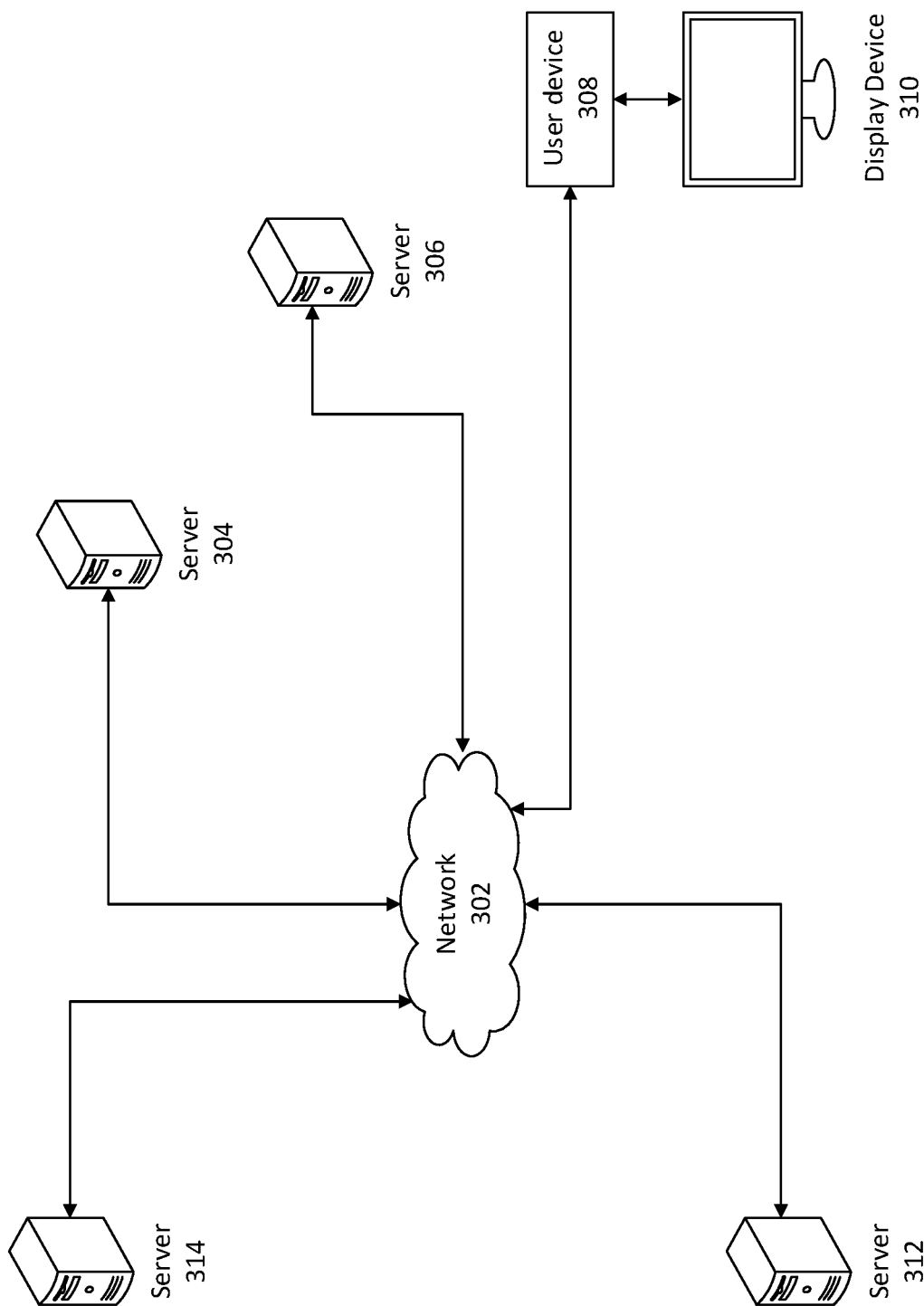
FIG. 3 shows an example system architecture.

FIG. 3 shows a system 300 in which DRM licenses may be retrieved (e.g., based on predictions of content items that will be requested) and/or stored. The system 300 may comprise a network 302, one or more user devices 308 (which may comprise one or more display devices 310), and one or more servers 304, 306, 312, and 314. The server 312 may, for example, comprise a DRM server (e.g., the DRM server 122). The server 304 may, for example, comprise a content server (e.g., the content server 106). The server 306 may, for example, comprise a proxy server. The server 314 may, for example, comprise a server from which content data (e.g., video data and/or audio data for a content item) may be retrieved. The network 302 may, for example, comprise one or more of the external network 109, the external network 209, and/or the communication links 101. The user device 308 may comprise, for example, a gateway (e.g., the gateway 111), a set-top box (e.g., the set-top box 113), and/or other computing devices. The distance of the server 306 from the user device 308 may be less than the distance of the server 304 from the user device 308.

A batch of DRM licenses may be stored on the server 304. A DRM license may be data that is separate from the video data and/or audio data for a DRM-protected content item. A DRM license may allow use of the video data and/or audio data to play back that DRM-protected content item. A DRM license may, for example, comprise an encryption key. A DRM license may be its own file, or may be data in a file that has other types of data. The server 304 may obtain the DRM licenses from the server 312 and/or from another source. Also or alternatively, DRM licenses may be stored on the server 306. Also or alternatively, DRM licenses may be stored on the user device 308. When DRM licenses are stored on the user device 308, the DRM licenses may be stored in one or more memories in and/or accessible by the user device 308.

A batch of DRM licenses may be stored on the server 306. The server 306 may be a proxy server 306 between the server 304 and the user device 308. The server 306 may be located such that the server 306 may be closer to the user device 308 than the server 304 and/or so that communication times between the user device 308 and the server 306 are shorter than communication times between the server 304 and the user device 308. A batch of manifests, video/audio segments, video data and/or audio data for a batch of content items may further be stored on the server 306.

The user device 308 may comprise hardware (such as a tuner, a coder/decoder (codec), etc.) and software (such as a runtime environment, etc.) that may execute a plurality of applications to receive and/or cause the output (e.g., via the display device 310) of one or more content items. A content item may comprise a presentation of a sporting event, a movie, a television program, and/or any other type of presentation of audio and/or video.

The user device 308 may receive a content item, via the network 302, by broadcast, multicast, narrowcast, unicast, etc. All receiving user devices 308 may receive and view content items by broadcast. A broadcast system may not distinguish users according to different entitlements. A broadcast system may have a specific schedule and content items may be streamed according to the schedule, for example, without catering to any specific or direct requests from any specific user devices 308. Users with certain entitlements may receive and view content items by multicast. For example, pay television services and premium television services may only be received by users with a certain subscription to a package of pay television services and premium television services. A multicast system may have a specific schedule, and may stream content items according to the schedule instead of catering to any specific requests from any specific user devices 308. Users with certain entitlements may receive and view content items by unicast. Users with certain entitlements may request a certain content item to be streamed specifically to a user device 308 (e.g., streamed only to a single user device 308). A unicast system may deliver content items to the user device 308 after receiving the request, and the same content items may be streamed to different user devices 308 at different times.

A content item received via the network 302 may comprise video and/or audio data that requires separate data (e.g., a DRM license) to be used to cause output of that content item. A content item may be associated with a manifest that identifies segments of the video data and/or audio data for the content item, and/or locations from which such segments may be retrieved. The user device 308 may store content data (e.g., video data and/or audio data for one or more content items), one or more manifests associated with the one or more content items, and/or one or more DRM licenses associated with the one or more content items.

DRM licenses may be stored initially on the server 312, and/or other sources. To obtain a DRM license from the server 312, the server 312 may require a key and/or other credentials. The server 304 may perform an authorization operation to generate keys and/or other credentials. Manifests and/or content segments for content items may be stored initially on the server 314, and/or other sources. To obtain content segments from the server 314, the server 314 may require a DRM license for DRM-protected content.

When performing an authorization operation to obtain a batch of DRM licenses from the server 312, and/or other sources, the server 304 may check user credentials and/or user subscriptions associated with a user account. The server 304 may further check copyright protection policies associated with each of the batch of content items. When storing a batch of DRM licenses on, for example, the server 304, the server 306, and/or the user device 308, the server 304 may encrypt the DRM licenses. Encrypting the DRM licenses may follow Advanced Encryption Standard (AES), Triple Data Encryption Standard (3DES), RSA algorithm, etc. When accessing the DRM licenses stored on the servers 304, 306, the server 304 may require a key to unlock access to the stored DRM licenses. The key may be generated during encryption and may be saved in a protected section of the servers 304, 306 and/or the user device 308. The server 304 may check the user credentials before allowing the key access. The server 304 may further encrypt the manifests, the video segments, and the content items. Each DRM license may have an effective time period or an expiration time associated with the content item copyright protection policies. The server 304 may check and register the effective time period or the expiration time of each DRM license. The server 304 may determine a predicted view time for a next video session of the user. Based on the effective time period or the expiration time of each DRM license, the DRM licenses may be preauthorized and stored at a time closer to the time when a user is predicted to watch a particular content item.

The DRM licenses, the manifests, and/or the content segments may be stored initially on different servers, for example, on the server 312 and/or the server 314. The server 304 may preauthorize and store the DRM licenses, the manifests, and the content segments on different servers and/or other computing devices, for example, the server 304, the server 306, and/or the user device 308. Though depicted separately, the different servers 304, 306, 312, and 314 may be the same server, for example, the server 304. One or more servers 304, 306, 312, or 314 may be combined in one server. For example, servers 312 and 314 may be one server, and servers 304 and 306 may be one server. The DRM licenses, the manifests, and/or the content segments may also be stored in any combination. For example, the DRM licenses and the manifests may be stored on the server 304 and the content segments may be stored on the server 306.

Figure 4:
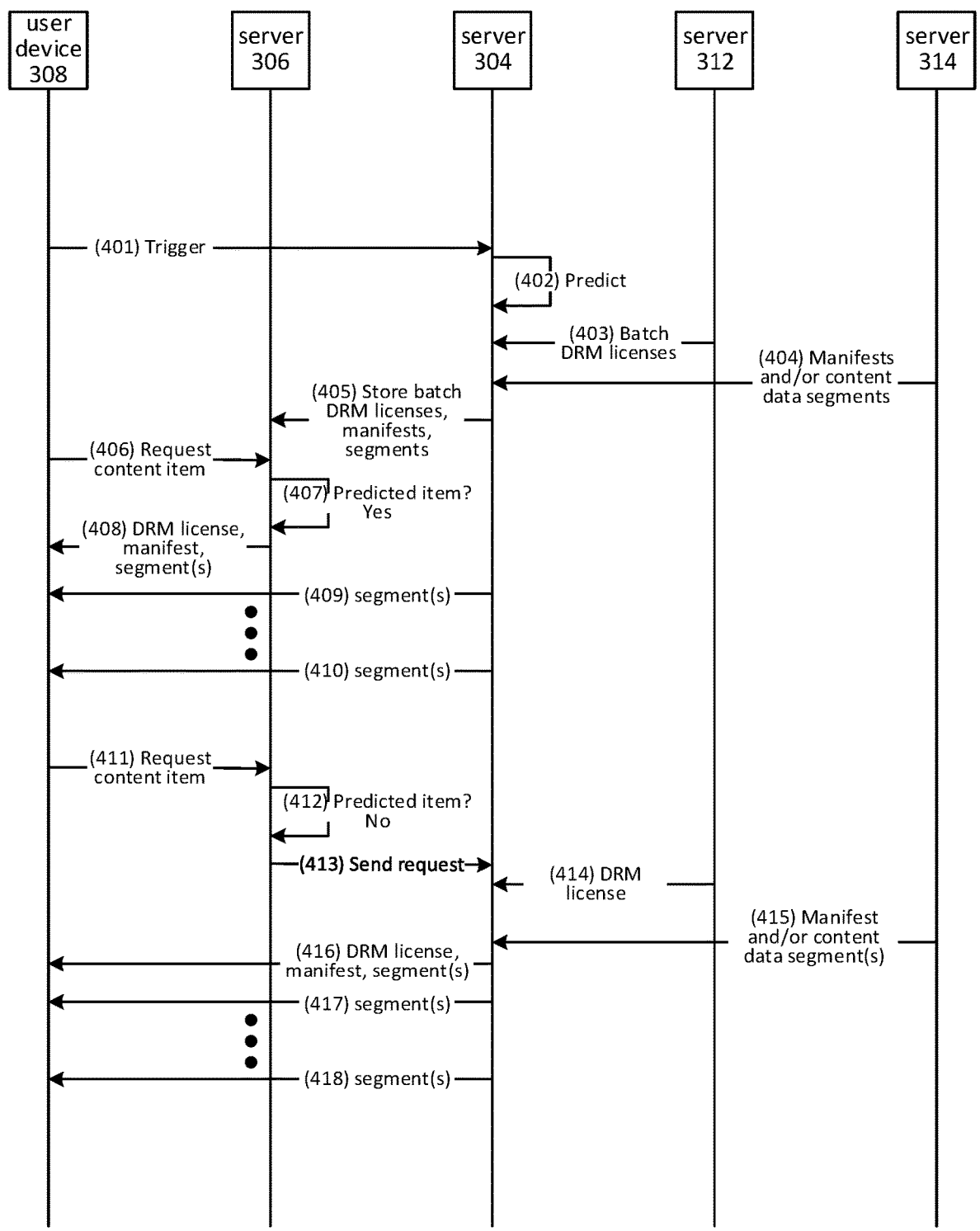
FIG. 4 shows an example of communications between system elements.

FIG. 4 shows an example of communications between system elements to preauthorize and/or store batch DRM licenses on the server 306, for example, a proxy server 306. The DRM licenses may be stored initially on the server 312. The manifests and/or the content data segments may be stored initially on the server 314.

At step 401, the user device 308 may trigger the server 304 to predict a batch of one or more content items that may be requested for output via the user device 308 at a later time. The prediction may be triggered by various system, device or user parameters or actions, for example, based on a display device 310 associated with the user device 308 being turned on, a display device 310 associated with the user device 308 being turned off, a starting of a video session, an ongoing video session, a completion of a video session, user interaction with content or applications, and/or other events. For example, a user device 308 may be configured to trigger prediction of one or more content items based on a schedule (e.g., every 24 hours).

At step 402, the server 304 may predict a batch of one or more content items that may be requested for output at a later time. The predicting may be based on a most recently viewed service. A service may, for example, comprise and/or otherwise be associated with a source of content. Examples of services may comprise specific content providers (e.g., entities associated with cable or broadcast "networks," entities providing on-line streaming and/or download of content, etc.), selectable content collections (e.g., "channels") assigned by a network operator, and/or any other source of content. The predicting may also or alternatively be based on a most frequently viewed service, a location of a service in a listing of services (e.g., whether a service is immediately adjacent or close to another service in a listing of services), a popularity of at least one of a content item and/or a service, a popularity of a content item to users in a geographic region, subject matter of a content item, a content item in a same series as a most recently viewed content item, a content item related to a content item being currently viewed via the user device, a content item related to a preview item being currently viewed via the user device, a content item in a most frequently viewed genre of content items, a user profile, one or more electronic communications or social media posts associated with a user account and/or a user profile, user demographics associated with a user account and/or a user profile, and/or other data.

At step 403, the server 304 may receive a batch of one or more DRM licenses for the predicted batch of content items from the server 312. Although not shown in FIG. 4, the server 304 may receive the batch DRM licenses based on (e.g., after and/or in response to) one or more requests sent by the server 304 to the server 312 and/or to other computing devices. The server 312 may require the server 304 to provide a key and/or other credentials before the server 304 may access and fetch the DRM licenses. The server 304 may check user credentials and/or subscriptions. If the user credentials and/or subscriptions allow access to the DRM-protected content, the server 304 may generate a key to send to the server 312 to unlock access to the DRM licenses.

At step 404, the server 304 may receive a batch of manifests and/or content data segments for the predicted content items from the server 314. Although not shown in FIG. 4, the server 304 may receive the batch of manifests and/or content data segments based on (e.g., after and/or in response to) one or more requests sent by the server 304 to the server 314 and/or to other computing devices. The server 314 may require the server 304 to provide a corresponding DRM license before the server 304 may access and fetch a manifest or content data segment for a DRM-protected content item.

At step 405, the server 304 may cause the server 306 to store the batch of DRM licenses, the manifests, and/or initial content data segments for the batch of predicted content items. The server 304 may cause the server 306 to encrypt the DRM licenses, the manifests, and/or the initial content data segments. If a content item is not requested for output, the DRM license, the manifest, and/or the initial content data segments associated with the content item may be stored for an extended time without being accessed. The encryption may increase security of the stored data that is not requested for access for an extended time.

At step 406, the user device 308 may send a request to the server 306 for a content item for output. At step 407, the server 306 may determine if the requested content item is among the predicted batch of content items. If it is, at step 408, the server 306 may send the DRM license, the manifest, and/or the initial content data segments for the requested content item to the user device 308. The user device 308 may send additional requests for additional segments based on the manifest. The server 304 may send a group of additional segments based on each request from the user device 308 such as in steps 409 and 410. Although sending of only two groups of segments is shown (steps 409 and 410), there may be many as indicated by ellipsis between steps 409 and 410. The server 304 may stop sending segments when the user device 308 gets to the end of the manifest for the content item and there are no more segments to ask for, or if the user device 308 stops requesting more segments because the user changed services or turned the display device 310 off.

At step 411, the user device 308 may send a request to the server 306 for another content item for output. At step 412, the server 306 may determine if the content item requested in step 411 is among the predicted batch of content items. If it is not, at step 413, the server 306 may request that content item from the server 304. At step 414, the server 304 may receive the DRM license for that content item from the server 312, and at step 415, the server 304 may receive the manifest and/or content data segment(s) for that content item from the server 314. Although not shown in FIG. 4, additional operations similar to those described in connection with step 403 may be performed in connection with step 414 and/or additional operations similar to those described in connection with steps 404 may be performed in connection with step 415. At step 416, the server 304 may send the DRM license, the manifest, and/or initial content data segments for the requested content item from step 411 to the user device 308. Additional operations similar to those described in connection with steps 409 and 410 may be performed in connection with steps 417 and 418.

The examples of FIGS. 4 through 7 show a predicted content item being requested (e.g., in step 406) before a non-predicted content item is requested (e.g., in step 411). Requests need not occur in this order, however. A non-predicted content item may be requested before a predicted content item.

Figure 5:
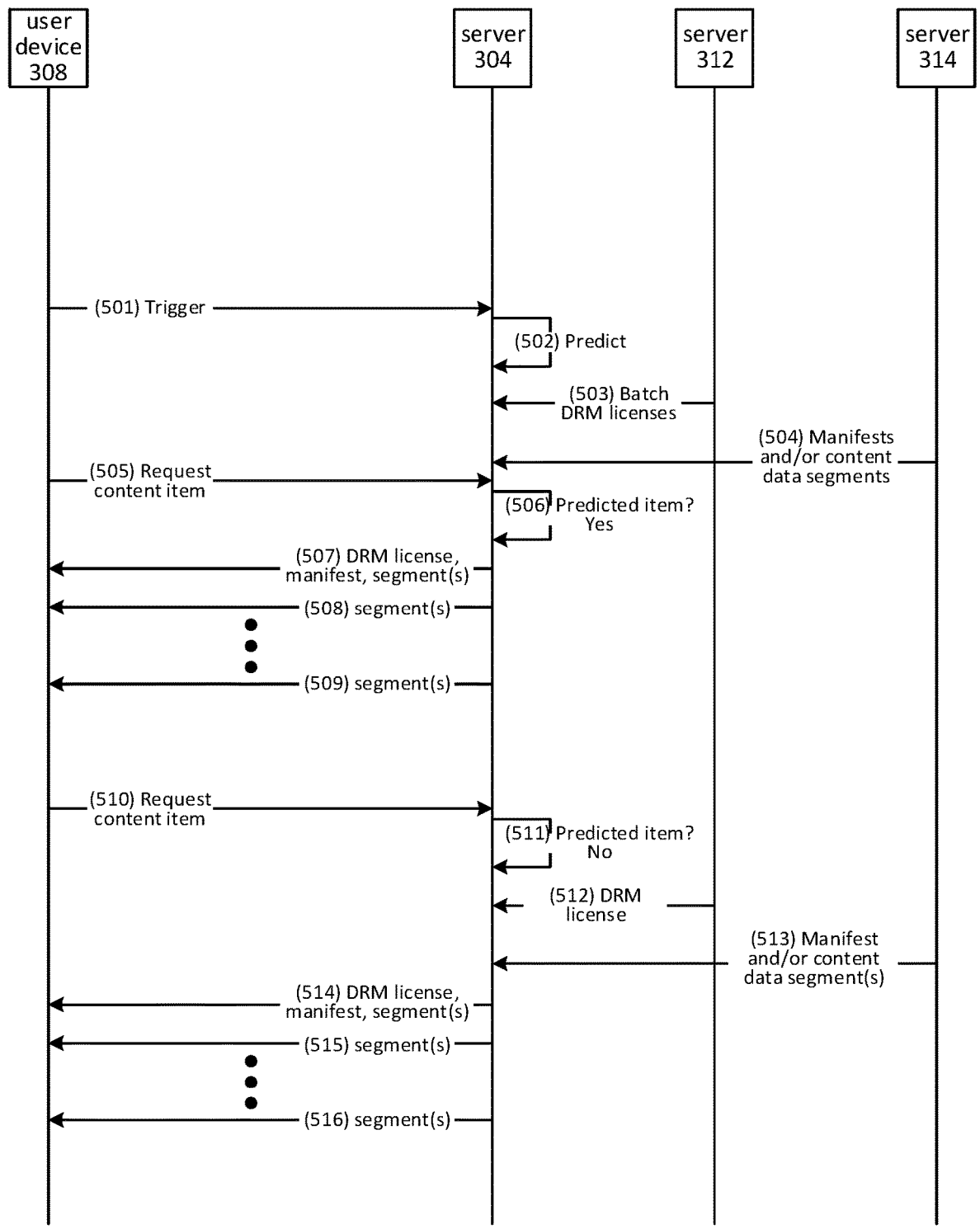
FIG. 5 shows an example of communications between system elements.

FIG. 5 shows an example of communications between system elements to preauthorize and/or store batch DRM licenses on the server 304. The DRM licenses may be stored initially on the server 312. The manifests and/or the content data segments may be stored initially on the server 314.

At step 501, the user device 308 may trigger the server 304 to predict a batch of one or more content items that may be requested for output via the user device 308 at a later time. The prediction may, for example, be triggered by one or more events such as those described in connection with step 401.

At step 502, the server 304 may predict a batch of one or more content items that may be requested for output at a later time. The predicting may, for example, be based on data such as that described in connection with step 402.

At step 503, the server 304 may receive a batch of one or more DRM licenses for the predicted batch of content items from the server 312. Although not shown in FIG. 5, additional operations similar to those described in connection with step 403 may be performed in connection with step 503.

At step 504, the server 304 may receive a batch of manifests and/or content data segments for the predicted content items from the server 314. Although not shown in FIG. 5, additional operations similar to those described in connection with step 404 may be performed in connection with step 504.

The server 304 may store the batch of DRM licenses received in step 504, and/or the manifests and/or the content data segments receive in step 504. The server 304 may encrypt the DRM licenses, the manifests, and/or the content data segments. If a content item is not requested for output, the DRM license, the manifest, and/or the initial content data segments associated with the content item may be stored for an extended time without being accessed. The encryption may increase security of the stored data that is not requested for access for an extended time.

At step 505, the user device 308 may send a request to the server 304 for a content item for output. At step 506, the server 304 may determine if the requested content item is among the predicted batch of content items. If it is, at step 507, the server 304 may send the DRM license, the manifest, and/or the initial content data segments for the requested content item to the user device 308. Additional operations similar to those described in connection with steps 409 and 410 may be performed in connection with steps 508 and 509.

At step 510, the user device 308 may send a request to the server 304 for another content item for output. At step 511, the server 304 may determine if the content item requested in step 510 is among the predicted batch of content items. If it is not, at step 512, the server 304 may receive the DRM license for that content item from the server 312, and at step 513, the server 304 may receive the manifest and/or content data segment(s) for that content item from the server 314. Although not shown in FIG. 5, additional operations similar to those described in connection with step 403 may be performed in connection with step 512 and/or additional operations similar to those described in connection with steps 404 may be performed in connection with step 513. At step 514, the server 304 may send the DRM license, the manifest, and/or initial content data segments for the requested content item from step 510 to the user device 308. Additional operations similar to those described in connection with steps 409 and 410 may be performed in connection with steps 515 and 516.

Figure 6:
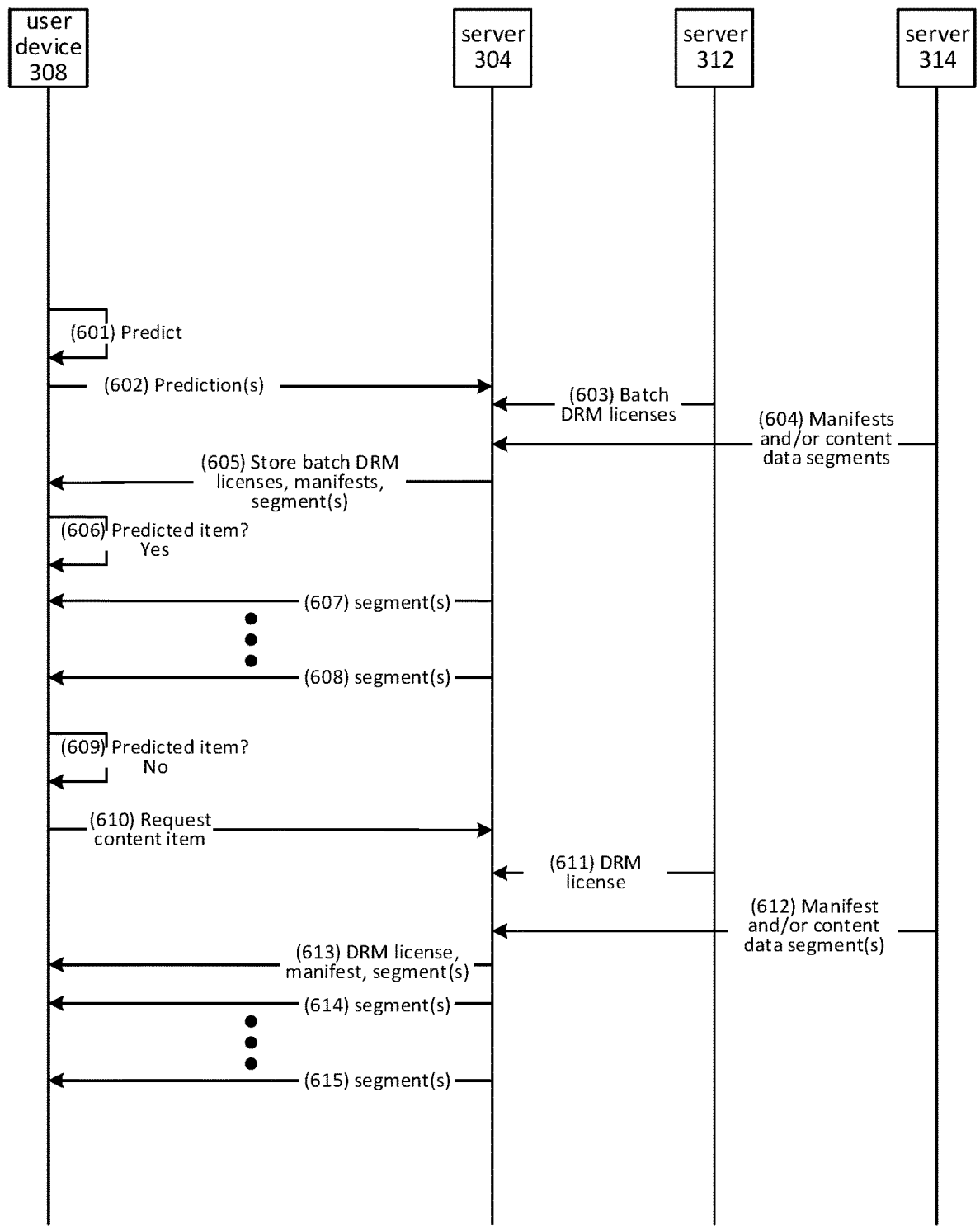
FIG. 6 shows an example of communications between system elements.

FIG. 6 shows an example of communications between system elements to preauthorize and/or store batch DRM licenses on the user device 308. The DRM licenses may be stored initially on the server 312. The manifests and/or the content data segments may be stored initially on the server 314.

At step 601, the user device 308 may predict a batch of one or more content items that may be requested for output via the user device 308 at a later time. The prediction may, for example, be triggered by one or more events such as those described in connection with step 401. The predicting may, for example, be based on data such as that described in connection with step 402.

At step 602, the user device 308 may send the predictions to the server 304. At step 603, the server 304 may receive a batch of one or more DRM licenses for the predicted batch content items from the server 312. Although not shown in FIG. 6, additional operations similar to those described in connection with step 403 may be performed in connection with step 603.

At step 604, the server 304 may receive a batch of manifests and/or content data segments for the predicted content items from the server 314. Although not shown in FIG. 6, additional operations similar to those described in connection with step 404 may be performed in connection with step 604.

At step 605, the server 304 may cause the user device 308 to store the batch of DRM licenses received in step 603, the manifests received in step 604, and/or initial content data segments from the content data segments received in step 604. The user device 308 may store the batch of DRM licenses, the manifests, and/or the initial content data segments in one or more memories in and/or accessible by the user device 308. The user device 308 may encrypt the DRM licenses, the manifests, and/or the initial content data segments. If a content item is not requested for output, the DRM license, the manifest, and/or the initial content data segments associated with the content item may be stored for an extended time without being accessed. The encryption may increase security of the stored data that is not requested for access for an extended time.

The user device 308 may receive (e.g., from a user input device) a request from the user for a content item for output. At step 606, the user device 308 may determine if the requested content item is among the predicted batch of content items. If it is, the user device 308 may access the DRM license, the manifest, and/or the initial content data segments for the requested content item already stored at the user device 308 as part of step 605. Additional operations similar to those described in connection with steps 409 and 410 may be performed in connection with steps 607 and 608.

The user device 308 may receive a request from the user for another content item for output. At step 609, the user device 308 may determine if the requested content item is among the predicted batch of content items. If it is not, at step 610, the user device 308 may send a request to the server 304 for that content item for output. At step 611, the server 304 may receive the DRM license for that content item from the server 312, and at step 612, the server 304 may receive the manifest and/or content data segment(s) for that content item from the server 314. Although not shown in FIG. 6, additional operations similar to those described in connection with step 403 may be performed in connection with step 611 and/or additional operations similar to those described in connection with steps 404 may be performed in connection with step 612. At step 613, the server 304 may send the DRM license, the manifest, and/or initial content data segments for the requested content item from step 610 to the user device 308. Additional operations similar to those described in connection with steps 409 and 410 may be performed in connection with steps 614 and 615.

Figure 7:
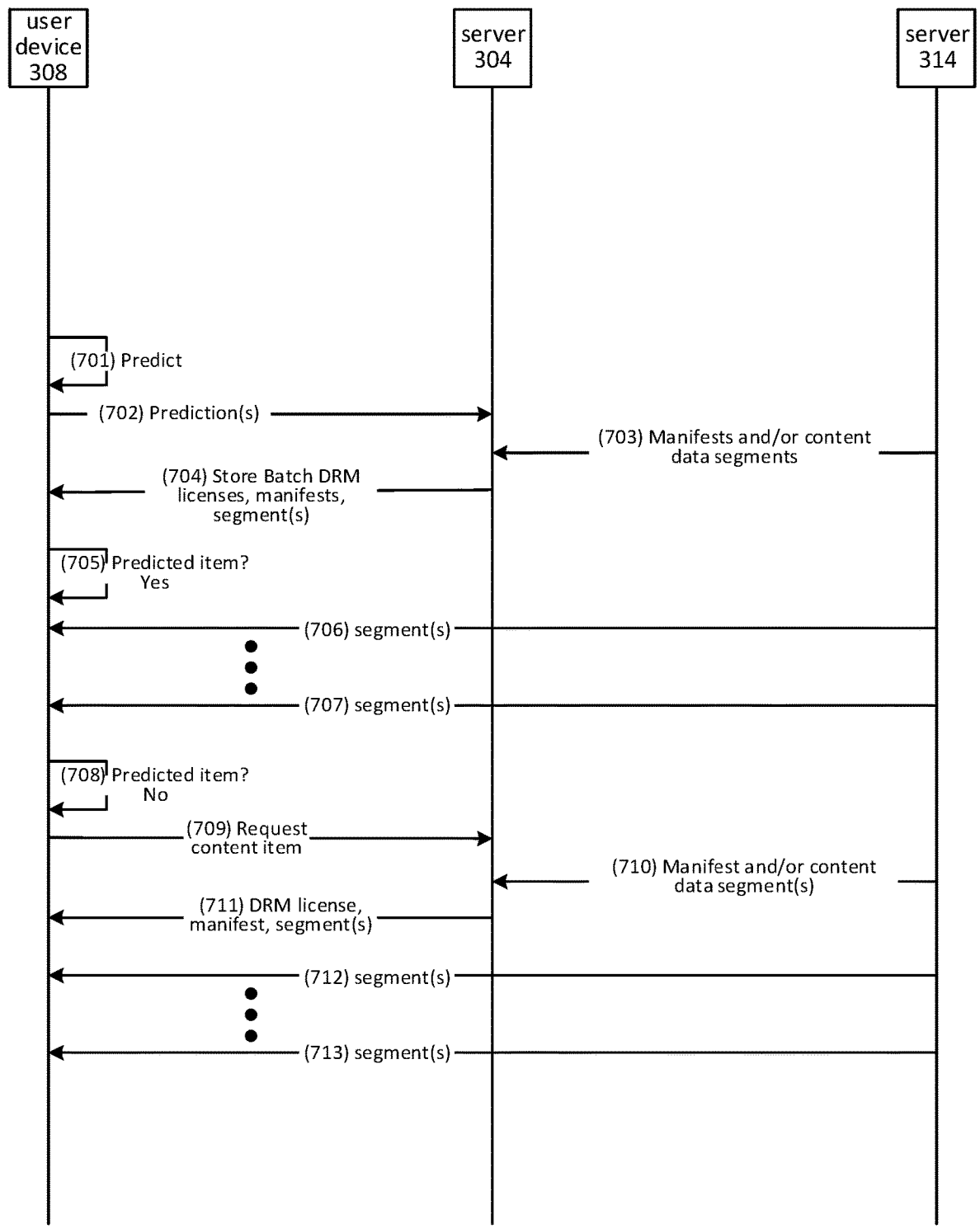
FIG. 7 shows an example of communications between system elements.

FIG. 7 shows an example of communications between system elements to preauthorize and/or store batch DRM licenses on the user device 308. The DRM licenses may be stored initially on the server 304. The manifests and/or the content data segments may be stored initially on the server 314.

At step 701, the user device 308 may predict a batch of one or more content items that may be requested for output via the user device 308 at a later time. The prediction may, for example, be triggered by one or more events such as those described in connection with step 401. The predicting may, for example, be based on data such as that described in connection with step 402.

At step 702, the user device 308 may send the predictions to the server 304. A batch of one or more DRM licenses for the predicted batch content items may already be on the server 304. The server 304 may check user credentials and/or subscriptions. If the user credentials and/or subscriptions allow access to the DRM-protected content, the server 304 may unlock access to the DRM licenses.

At step 703, the server 304 may receive a batch of manifests and/or content data segments for the predicted content items from the server 314. Although not shown in FIG. 7, additional operations similar to those described in connection with step 404 may be performed in connection with step 703.

At step 704, the server 304 may cause the user device 308 to store the batch of DRM licenses, the manifests received in step 703, and/or the initial content data segments from the content data segments received in step 703. The user device 308 may store the batch of DRM licenses, the manifests, and/or the initial content data segments in one or more memories in and/or accessible by the user device 308. The user device 308 may encrypt the DRM licenses, the manifests, and/or the initial content data segments.

The user device 308 may receive (e.g., from a user input device) a request from the user for a content item for output. At step 705, the user device 308 may determine if the requested content item is among the predicted batch of content items. If it is, the user device 308 may access the DRM license, the manifest, and/or the initial content data segments for the requested content item already stored at the user device 308 as part of step 704. The user device 308 may send additional requests for additional segments based on the manifest. The server 314 may send a group of additional segments based on each request from the user device 308 such as in steps 706 and 707. Although sending of only two groups of segments is shown (steps 706 and 707), there may be many as indicated by ellipsis between steps 706 and 707. The server 314 may stop sending segments when the user device 308 gets to the end of the manifest for the content item and there are no more segments to ask for, or if the user device 308 stops requesting more segments because the user changed services or turned the display device 310 off.

The user device 308 may receive a request from the user for another content item for output.

At step 708, the user device 308 may determine if the requested content item is among the predicted batch of content items. If it is not, at step 709, the user device 308 may send a request to the server 304 for that content item for output. At step 710, the server 304 may receive the manifest and/or content data segment(s) for that content item from the server 314. Although not shown in FIG. 7, additional operations similar to those described in connection with step 404 may be performed in connection with step 710. At step 711, the server 304 may send the DRM license which is stored initially on the server 304, the manifest, and/or initial content data segments for the requested content item from step 709 to the user device 308. Additional operations similar to those described in connection with steps 706 and 707 may be performed in connection with steps 712 and 713.

As shown in FIGS. 4-7, operations performed after a request for a non-predicted content item may, for a predicted content item, be performed before a request is received. For a content item (e.g., as requested in steps 406, 505, 606, and 705) that is in a predicted batch of content items, a delay between a time of request and a time that output of the content item commences may thus be less than a delay between request and output commencement associated with a content item (e.g., as requested in steps 411, 510, 610 and 709) that is not in a predicted batch of content items. This may allow a faster response time from a user's perspective. The faster response time may also or alternatively be improved if DRM licenses, manifests, and/or content data segments for predicted content items are stored in a server (e.g., the server 306) that is located closer to the user device 308, and/or that serves a smaller group of user devices, than a server storing DRM licenses, manifests, and/or content data segments for non-predicted content items. The faster response time may also or alternatively be improved if DRM licenses, manifests, and/or content data segments for predicted content items are stored in the user device 308.

The operations and/or configurations shown in the examples of FIGS. 4 through 7 may be modified in any of numerous ways. For example, in FIG. 4, the batch DRM licenses, the manifests, and initial content data segments may be already on the server 306, and/or the remaining segments (e.g., for portions of a content item after a portion corresponding to initial segments) may be received from the server 314 after the server 304 receives the request from the user device 308. In FIG. 5, the batch DRM licenses, the manifests, and initial content data segments may be already on the server 304, and/or the remaining segments may be received from the server 314 after the server 304 receives the request from the user device 308. Prediction may be performed at the user device 308 (e.g., as described in connection with FIGS. 6 and 7), but DRM licenses, manifests, and/or initial segments may be stored at a proxy server (e.g., the server 306). Initial segments for a predicted content item may be stored at a proxy server (e.g., the server 306) and/or the user device, with remaining segments provided by a server (e.g., the server 314) that also provides content segments for non-predicted content items. The manifests and the content data segments may be on different servers (e.g., not both on the server 314). The DRM licenses may be received from different DRM servers 312. The server 312 and server 314 may be the same server.

Figure 8:
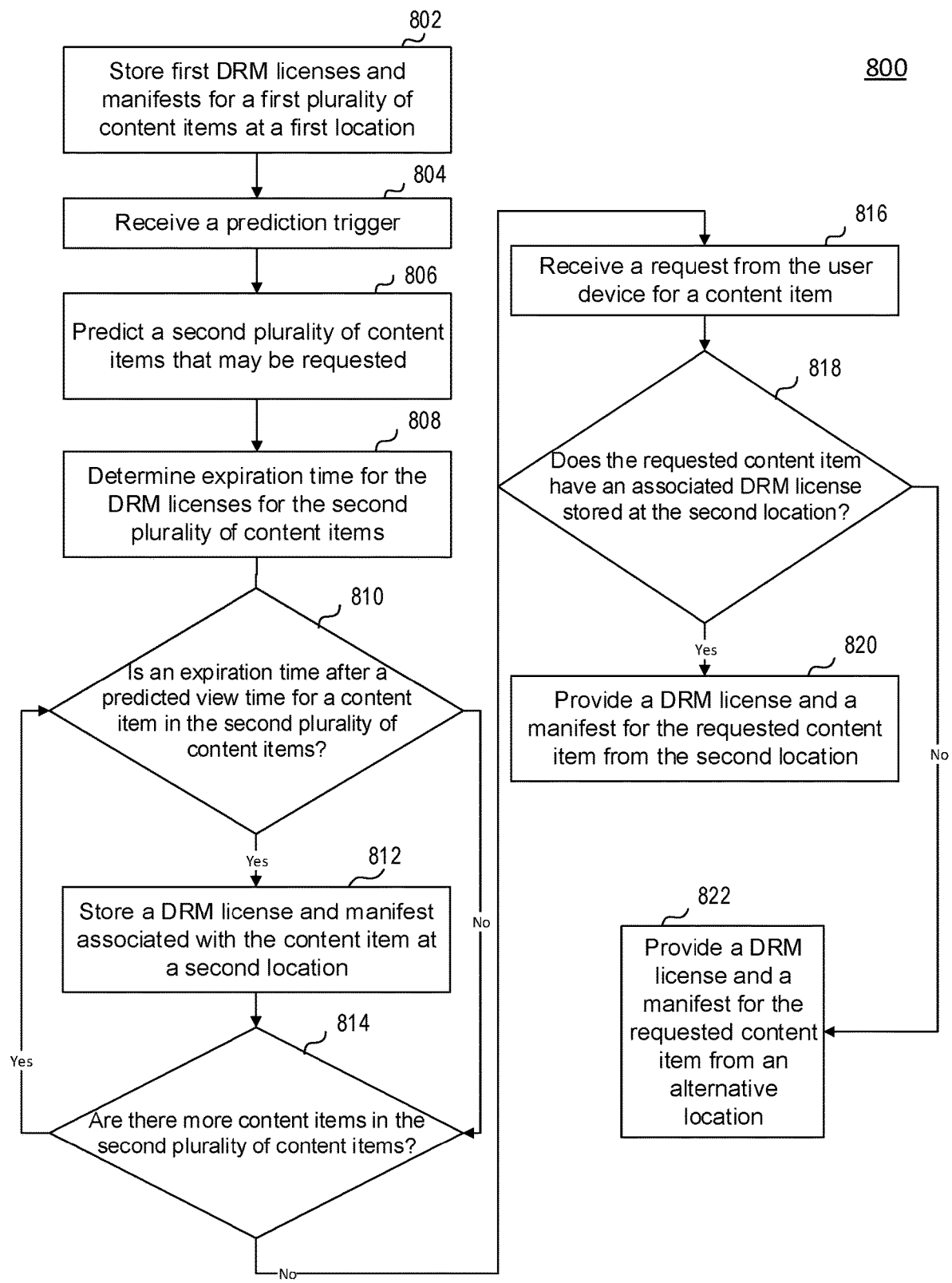
FIG. 8 is a flow chart showing an example method for preauthorizing and/or storing DRM licenses.

FIG. 8 is a flow chart showing an example method 800 for preauthorizing and storing DRM licenses. Although examples of devices that may perform steps of the method 800 are included in the below description, one, some, or all steps may also or alternatively be performed by one or more other computing devices. One or more steps of the method 800 may be rearranged, omitted, and/or otherwise modified, and/or other steps added.

At step 802, DRM licenses, or associated data, may be accessed or stored at or from a first location. The first DRM licenses may permit output via a user device of a first plurality of content items requestable by a user device (e.g., the user device 308). The first location may be, for example, a server such as the server 312. Also or alternatively, the first location may comprise a server such as the server 304. At step 802, first manifests may be stored at the first location and/or at one or more additional locations. For a content item of the first plurality of content items, each of the first manifests may indicate content segments retrievable by the user device 308. The one or more additional locations may be, for example, a server such as the server 314. At step 802, content data segments may be stored at the first location and/or at the one or more additional locations.

At step 804, a prediction trigger may be received. For example, the server 304 may receive a prediction trigger from the user device 308. Also or alternatively, the user device 308 may receive a prediction trigger from a display device 310 associated with the user device 308. The prediction trigger may be based on a display device 310 associated with the user device 308 being turned on. Turning on a display device 310 associated with the user device 308 may indicate that a user is about to start a video session. The sent trigger may comprise an electrical signal indicating the display device 310 being turned on. The predicting may be triggered based on a display device 310 associated with the user device 308 being turned off. This prediction may prepare the user device 308 for a next video session. The sent trigger may comprise an electrical signal indicating the display device 310 being turned off.

The predicting may be triggered based on a starting of a video session. The predicting may be triggered based on a display device 310 associated with the user device 308 being turned on or being turned off, however, the prediction may not be correct. Based on a starting of a video session, the prediction may be updated based on the content item requested or currently playing. Updating the predicted content items may increase the likelihood of a next requested content item being among the batch of predicted content items, so that the DRM license may be readily available. Similarly, the prediction may be updated based on an ongoing video session, or based on a completion of a video session. The sent trigger may comprise a manifest associated with the video session.

At step 806, based on the received trigger, one or more second content items may be predicted. The one or more second content items may be content items that are predicted to be requested by a user device in the future. The predicting of step 806 may be performed by the server 304 or the user device 308. The server 304, or the user device 308, may determine a prediction of a second plurality of content items that may be requested for output via the user device 308. The predicted second plurality of content items may be among the first plurality of content items. If the user device 308 determines the prediction, the server 304 may receive the predictions from the user device 308. The predicting of step 806 may comprise predicting, based on one or more types of information, one or more content items that may be requested by the user device 308 during one or more future time periods. Although examples of bases for prediction are described below, predictions may also or alternatively be based on other types of data.

One or more content items may be predicted in step 806 based on one or more service(s) that have most recently been accessed via the user device 308. Most recently viewed service(s) may be viewed again in a next video session. For example, a recently viewed service may have reruns of a series of content items. The service may be viewed again in a next video session because the service may stream more reruns of the same series of content items. As another example, a user may have recently viewed a service for stock market performance. The user may view the service again in a next video session because the user may want to view the up-to-date stock market performance. As an additional example, a user may have recently viewed a service for a romance movie around Christmas time. The user may view the service again because the user may find more romance movies on that service during Christmas time.

The predicting of step 806 may also or alternatively comprise, for example, predicting one or more content items based on a most frequently viewed service. Most frequently viewed service(s) may show subject matter of content items that a user frequently views. For example, a frequent view of a weather service may show how the user may get information on weather, and it may be likely that the user may view the service again in a next video session to check the weather. A frequent view of a history service may indicate a particularly attractive feature of the service to the user, because other services may not offer a wide selection of content items of similar subject matter. As another example a user may frequently view reruns of a series of content items. Services that may stream the same series of content items may be viewed by the user in a next video session. Most frequently viewed service(s) may also show a preference of a user. For example, if a user frequently views one news service for current affairs, it may be more likely that the same news service may be viewed again by the user rather than another news service with different political views.

The predicting of step 806 may also or alternatively comprise, for example, predicting one or more content items based on a location of a service in a listing of services. In certain scenarios, a user may not be particularly interested in viewing any service(s) or any content item(s). The user may browse through services one by one in an increasing or decreasing order. It may be useful to store DRM licenses for content items on service(s) adjacent or close to the currently viewed service. As the user browses through more services, DRM licenses for more content items on services that are adjacent or close to the currently viewed service in a listing of services may be preauthorized and stored. Additionally, if the user selects a service and views a content item of a certain genre, such as a comedy, or a sporting event, and then continues to browse through more services, the user may not be interested in any particular services or content items, but the user may be interested in the general genre of comedy or sports, etc. The prediction may then be services streaming the same genre of content items that are adjacent or close, instead of every service that is adjacent or close.

The predicting of step 806 may also or alternatively comprise, for example, predicting one or more content items based on a popularity of at least one of a content item or a service. For example, new episodes of a series of content items may be made available at 9 PM on Tuesdays. Based on the popularity of the series, it may be useful to preauthorize and store the DRM license associated with the episode at a second location (e.g., the server 304, the server 306, the user device 308) before the make-available time. Another example is new episodes of several series of content items on a same service may be made available on a same night (e.g., several series on a service make new episodes available on Sunday evenings). Based on the popularity of the service, it may be useful to preauthorize and store the DRM licenses for the several series on the service at the second location for every Sunday evening. For another example, morning variety show series may be more popular in the mornings during weekdays but Saturday variety show series may be more popular on Saturday nights.

The predicting of step 806 may also or alternatively comprise, for example, predicting one or more content items based on a popularity of a content item to users in a geographic region. For example, if there is a football game for a Pittsburgh sports team on Monday night, it may predictable that many users in geographic areas located in the western part of Pennsylvania may watch the football game. It may be useful to preauthorize and store the DRM license for the football game on servers (e.g., such as the server 304 and/or the server 306) in those geographic areas. As another example, for a soccer match between national teams of Brazil and Germany, there may be more users wanting to view that match because of the popularity of the national teams playing. It may be useful to preauthorize and store the DRM license for the soccer match on servers (e.g., such as the server 304 and/or the server 306) in or near cities, because most users that may want to watch the soccer match may live in cities.

The predicting of step 806 may also or alternatively comprise, for example, predicting one or more content items based on a user profile. The user profile may comprise information for the user's interests such as cooking, fishing, music, sports, paranormal activities, etc. For example, a user with interest in cooking may be more likely to view a service featuring many food-related content items. A user with interest in fishing may be more likely to view fishing content items on services providing wildlife-related content. A user with interest in music may be more likely to view music competition content items. A user with interest in sports may be more likely to view services streaming games of football, hockey, baseball, etc. A user with interest in paranormal activities may be more likely to view content items featuring haunted houses, ghost encounters, etc.

The predicting of step 806 may also or alternatively comprise, for example, predicting one or more content items based on subject matter of a content item. For example, during a special event such as the Olympic Games, content items containing subject matter such as gymnastics, swimming, diving, etc. may be likely to be viewed by users. As another example, and for some types of sports (e.g., football, hockey, baseball, soccer, etc.), users may view the championship games but may not care about regular season games. As a further example, users may want to view music and film award ceremonies.

The predicting of step 806 may also or alternatively comprise, for example, predicting one or more content items based on a content item in a same series as a most recently viewed content item. For example, if a user views three episodes of a series of content items, it may be likely that the user will want to view another several episodes of the same series in a next video session. As another example, a user who completes a season of a series of content items may be more likely to want to view another season of the same series in a next video session.

The predicting of step 806 may also or alternatively comprise, for example, predicting one or more content items based on a content item related to a content item being currently viewed via the user device. For example, if a user is currently viewing an episode of a series of content items, it may be likely that the user will want to continue to view another several episodes of the same series. As another example, a user currently viewing a movie may want to view another movie next because both movies feature a same actor/actress. As a further example, a user currently viewing a movie may be likely to view another movie having connected ties (e.g., prequel or sequel) in the plot. Or it may be likely that the user may want to view another movie in the same genre (e.g., both movies are horror movies).

The predicting of step 806 may also or alternatively comprise, for example, predicting one or more content items based on a content item related to a preview item being currently viewed via the user device. For example, if a user is currently viewing a preview for a movie, it may be likely that the user may want to watch the movie. It may also be likely that the user may want to watch another movie related to the movie associated with the preview item, such as a movie in a same genre, or having connections in the plot. As another example, a user currently viewing a preview for a movie in a Chinese language may want to watch the movie or another movie in that Chinese language.

The predicting of step 806 may also or alternatively comprise, for example, predicting one or more content items based on a content item in a most frequently viewed genre of content items. For example, if a user frequently views series, movies, and/or services related to science fiction, it may be more likely that the user will want to view more movies and series in the science fiction genre. If a user frequently views series, movies, and/or services related to comedy, it may be more likely that the user will want to view more movies and series in the comedy genre. If a user frequently views series, movies, and/or services related to fantasy, it may be more likely that the user will want to view more movies and series in the fantasy genre.

The predicting of step 806 may also or alternatively comprise, for example, predicting one or more content items based on user demographics associated with a user account. User demographics associated with the user account may comprise age, gender, sexual orientation, race, marital status, whether the user has children, occupation, income, education level, political affiliation, religious affiliation, nationality, and/or any other characteristics. Demographic data for a user may be estimated, e.g., based on ZIP code and/or other data associated with the user. Different user demographics may solicit different suggestions on the content items. For instance, a person of advanced age may be more likely to view a series of content items produced when they were younger. A female user may, based on observed demographic data, be more likely to view a particular type of content than a male user. A user with children may be more likely to view animated content items and/or services. A user with at least a bachelor's degree may be more likely to view a series of content items with more complex linguistic structures and more advanced scientific backgrounds. A user who works in the health care profession may be more likely to view a series of content items associated with the same occupation. A user who self-identifies as religious may be more likely to view a content item having religious themes. A user with Korean heritage may be more likely to view a Korean drama.

The predicting of step 806 may also or alternatively comprise, for example, predicting one or more content items based on one or more electronic communications and/or one or more social media posts associated with a user account. For example, a user may post on a social media site, "So excited about the movie night on Saturday to watch [movie title] !" It may then be useful to preauthorize and store a DRM license for the movie at the second location (e.g., the server 304, the server 306, the user device 308) that may not expire before Saturday. As another example, the user may message a friend about the movie night via text, phone, email, messaging applications, etc. From the contents of the electronic communications, the server 304 may also predict the content items to be viewed.

At step 808, expiration times and/or effective times for DRM licenses for the second plurality of content items may be determined. For example, the server 304 may check and register the effective time period and/or the expiration time of each DRM license for the second plurality of content items. The effective time period and/or the expiration time for each DRM license may be associated with the content item copyright protection policies and/or may be determined by content producers, distributors, service providers, etc. Content items associated with DRM licenses may be accessed when those DRM licenses are valid. After these DRM licenses expire, the content items associated with those DRM licenses may no longer be accessible, and it may be necessary for new DRM licenses to be authorized and/or stored.

At step 810, a predicted view time of a content item of the second plurality of content items may be determined based on a viewing history of the user, and that predicted view time may be compared to an expiration time and/or effective time of a DRM license for that content item. If the expiration time is before the predicted view time (e.g., if the predicted view time is outside the effective time of the DRM license), there may be no benefit to preauthorizing and/or storing that DRM license for use by the user device 308. A predicted view time may be based on a viewing history associated with a user device and/or a user. For example, a viewing history may show that a user may start video sessions after 9:30 PM on a weekday, but the user may start video sessions around 11 AM on weekends. If the user completes episode 5 of a series on Tuesday, for example, it may be likely that the user may view episode 6 on Wednesday after 9:30 PM. If the user completes episode 10 of the series on Friday, it may be likely that the user may view episode 11 on Saturday after 11 AM.

If it is determined in step 810 that a predicted view time for a content item is before an expiration of (e.g., is within the effective time of) the DRM license for that content item, and as shown at step 812, that DRM license and a manifest for the content item may be stored at a second location for use by the user device. For example, the server 304 may preauthorize and store the DRM license and the manifest at a second location (e.g., the server 304, the server 306, the user device 308). Storing the DRM license may comprise moving the DRM license from the first location to the second location. For example, the server 304 may cause storage of the DRM license and the manifest at the second location. The DRM license may permit output of the first content item via the user device 308. The manifest may indicate content segments retrievable by the user device 308. The DRM license may be stored on the same second location with the manifest. Or the DRM license may be stored on a different second location with the manifest. If it is determined in step 810 that a predicted view time for a content item is not before an expiration of (e.g., is not within the effective time of) the DRM license for that content item, step 814 may be performed.

At step 814, a determination may be made whether there are remaining predicted content items in the second plurality of content items for which step 810 has not been performed. If yes, step 810 and (if applicable) step 812 may be performed for a next remaining predicted content item. If no, step 816 may be performed.

At step 816, a request for a content item may be received via the user device 308. A request via the user device 308 may comprise a request from the user device 308, a request received at the user device 308, a request initiated by another device (e.g., remote control) and processed by the user device 308, etc. For example, the server 304 may receive a request from the user device 308 to play back a content item. The user device 308 may further process a request initiated by an input device of a user, such as a mouse, a keyboard, a remote control device, etc. For example, the user may use the remote control device to navigate through a selection of services and/or content items, and select one of the services and/or content items. The input device may comprise a voice command function. For example, the user may issue a voice command, "Show movies with Actress A." Based on the voice command, the server 304 may recommend movies with Actress A, or a series of content items with Actress A, or movies with actors/actresses related to Actress A such as movies starring a costar actor/actress of Actress A in another movie or series. The input device may comprise a gesture command function, whereby cameras and sensors may track hand or body gestures to navigate and select services and/or content items. Content items in a same series may continue streaming after a request for one of the content items in the series is received.

At step 818, a determination may be made whether the requested content item has an associated DRM license and/or a manifest stored at the second location (e.g., the server 304, the server 306, the user device 308). If so, and as shown at step 820, the stored DRM license and/or manifest for the requested content item may be made available. If no, and as shown at step 822, a DRM license and/or manifest for the requested content item may be provided from another source (e.g., from the server 312 and/or the server 314).

Additional steps may be included in the method 800. For example, after a "no" determination at step 810, one or more flags may be set so that, if a viewing session via the user device is initiated before the next predicted view time and also before the DRM license for the predicted content item expires, that DRM license and a manifest for that predicted content item may be stored for use by the user device. Also or alternatively, one or more flags may be set so that, at a time closer to the next predicted view time, a new DRM license is obtained and stored (e.g., with a manifest) for use by the user device.

An advantage for the method 800 is that the server 304 may preauthorize and store DRM licenses for a batch of predicted content items, instead of authorizing and obtaining DRM license one at a time after each content item is requested to start. Delays associated with initiating viewing of content may thereby be reduced.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   predicting, responsive to a triggering event associated with a user device, a plurality of content items that may be requested for output via the user device;
   based on the predicted plurality of content items, determining a first access rights license and a different, second access rights license, wherein:
      the first access rights license permits output, via the user device, of a first content item of the plurality of content items,
      the second access rights license permits output, via the user device, of a second content item of the plurality of content items, and
      the first content item is different than the second content item;
   predicting a first time period during which the first content item will be output via the user device, and a second time period during which the second content item will be output via the user device;
   determining that a first expiration time of the first access rights license is after the first time period;
   determining that a second expiration time of the second access rights license is after the second time period;
   causing, based on:
      a first expiration time being after the first time period, and
      a second expiration time being after the second time period,
   and prior to any request via the user device for a content item of the plurality of content items, sending the first access rights license and the second access rights license from one or more first computing devices to a second computing device different from the one or more first computing devices; and
   providing, based on a request via the user device for the first content item of the plurality of content items, from the second computing device and for use by the user device, the first access rights license for the first content item.

2. The method of claim 1, wherein the triggering event comprises one or more of:
   a display device, associated with the user device, being turned on or turned off;
   a video session associated with the user device;
   accessing a service via the user device; or
   interaction, via the user device, with one or more of content or an application.

3. The method of claim 1, wherein the determining the first access rights license and the second access rights license comprises determining Digital Rights Management (DRM) licenses associated with the predicted plurality of content items.

4. The method of claim 1, further comprising:
   determining, based on the predicted plurality of content items, manifests that indicate content segments of the plurality of content items;
   causing, based on the predicted plurality of content items, storing of the manifests and one or more content segments indicated by one or more of the manifests at the second computing device; and
   providing, from the second computing device, a first manifest and first initial content segments for the first content item.

5. The method of claim 1, wherein the causing sending the first access rights license and the second access rights license comprises causing sending, to a location other than the user device, the first access rights license and the second access rights license, and wherein the providing the first access rights license comprises sending the first access rights license to the user device.

6. The method of claim 1, further comprising:
   causing storing, at a first location, of additional access rights licenses; and
   wherein the second computing device is at a second location located closer to the user device than the first location.

7. The method of claim 1, wherein the predicting the plurality of content items comprises predicting the plurality of content items based on one or more of:
   one or more content items viewed via the user device;
   a user profile associated with the user device;
   demographics associated with the user device; or
   one or more social media posts associated with the user device.

8. The method of claim 1, wherein the first time period is equal to the second time period.

9. The method of claim 1, wherein the triggering event comprises an indication that a first set of content items has been selected via the user device, and wherein the method further comprises:
   predicting, based on the triggering event, a second set of content items, the second set of content items being different from the first set of content items.

10. The method of claim 1, further comprising:
    causing storing, at a first location, of additional access rights licenses;
    determining, based on the predicted plurality of content items, manifests that indicate content segments of the plurality of content items; and
    wherein the causing sending the first access rights license and the second access rights license comprises causing sending the first access rights license and the second access rights license, the manifests, and one or more content segments indicated by one or more of the manifests to a second location located closer to the user device than the first location.

11. A method comprising:
    predicting, responsive to a triggering event associated with a user device and based on a user identification associated with the user device:
       a content item that will be requested, and
       a time period during which the content item will be output via the user device;

determining, based on the predicted content item, an access rights license that permits output of the content item;

determining that an expiration time of the access rights license is after the time period;

causing, prior to any request, associated with the user identification, for the content item and based on the expiration time being after the time period, sending of the access rights license from one or more first computing devices to a second computing device different from the one or more first computing devices; and providing, from the second computing device to the user device, and based on a request, associated with the user identification, for the content item, the access rights license.

12. The method of claim 11, wherein the triggering event comprises one or more of:
a display device, associated with the user device, being turned on or turned off;
a video session associated with the user device;
accessing a service via the user device; or
interaction, via the user device, with one or more of content or an application.

13. The method of claim 11, wherein the determining the access rights license comprises determining a Digital Rights Management (DRM) license associated with the content item.

14. The method of claim 11, further comprising:
causing storing, at a first location, of additional access rights licenses; and
wherein the second computing device is at a second location located closer to the user device than the first location.

15. The method of claim 11, further comprising:
determining, based on the predicted content item, a manifest that indicates content segments of the content item;
causing, based on the predicted content item, storing of the manifest and of initial content segments indicated by the manifest at the second computing device; and
providing, from the second computing device to the user device, the stored manifest and initial content segments.

16. The method of claim 11, wherein the predicting the content item that will be requested for output via the user device comprises predicting the content item based on one or more of:
one or more content items viewed via the user device;
a user profile associated with the user device;
demographics associated with the user device; or
one or more social media posts associated with the user device.

17. A method comprising:
predicting, responsive to a triggering event associated with a user device, a plurality of content items that may be requested for output via the user device;

predicting a time period, during which a first content item, of the plurality of content items, will be output via the user device;

determining that an expiration time of a first access rights license is after the time period;

causing, based on the expiration time being after the time period, sending of the first access rights license, which permits output of the first content item, to a second computing device, at a second location, from one or more first computing devices, at a first location different from the second location;

receiving a first request for the first content item for output via the user device;

providing, based on the first request and on a determination that the plurality of content items comprises the first content item, and from the second computing device, the first access rights license for the first content item;

receiving a second request for a second content item for output via the user device; and providing, based on the second request and on a determination that the plurality of content items does not comprise the second content item, and from the one or more first computing devices, a second access rights license, different from the first access rights license, for the second content item.

18. The method of claim 17, wherein the triggering event comprises one or more of:
a display device, associated with the user device, being turned on or turned off;
a video session associated with the user device;
accessing a service via the user device; or
interaction, via the user device, with one or more of content or an application.

19. The method of claim 17, wherein the providing the first access rights license for the first content item comprises providing a first Digital Rights Management (DRM) license associated with the first content item, and wherein the providing the second access rights license for the second content item comprises providing a second DRM license associated with the second content item.

20. The method of claim 17, wherein the second location is closer to the user device than the first location.

21. The method of claim 17, further comprising:
causing, prior to the providing the first access rights license for the first content item, and based on the first content item being one of the predicted plurality of content items, storing of the first access rights license for the first content item at the user device.

22. The method of claim 17, further comprising:
causing, based on the predicted plurality of content items and prior to receiving the first request for the first content item, storing of a manifest and initial content segments for the first content item at the second computing device.

* * * * *